(12) United States Patent
Uvarov

(10) Patent No.: US 8,174,592 B2
(45) Date of Patent: May 8, 2012

(54) COLOR INTERPOLATION DEVICE AND COLOR INTERPOLATION METHOD

(75) Inventor: Timofei Uvarov, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 409 days.

(21) Appl. No.: 12/585,209

(22) Filed: Sep. 8, 2009

(65) Prior Publication Data

US 2010/0060795 A1 Mar. 11, 2010

(30) Foreign Application Priority Data

Sep. 8, 2008 (KR) .................. 10-2008-0088039

(51) Int. Cl.
*H04N 3/14* (2006.01)
(52) U.S. Cl. .................. 348/272; 348/273; 348/280
(58) Field of Classification Search .................. None
See application file for complete search history.

(56) References Cited

U.S. PATENT DOCUMENTS

2004/0141072 A1* 7/2004 Nilsson et al. ............... 348/272
2005/0200733 A1 9/2005 Malvar

FOREIGN PATENT DOCUMENTS

| EP | 1439 715 | 7/2004 |
| KR | 10-2005-0051437 | 6/2005 |
| KR | 10-2006-0078646 | 7/2006 |

* cited by examiner

*Primary Examiner* — Jason Chan
*Assistant Examiner* — Yih-Sien Kao
(74) *Attorney, Agent, or Firm* — Harness, Dickey & Pierce, P.L.C.

(57) ABSTRACT

A color interpolation device may include a gradient grade calculation block calculating horizontal derivatives and vertical derivatives using composite video signals output from a current pixel and adjacent pixels and calculating a gradient grade using a linear composition of the horizontal derivatives and vertical derivatives, a horizontal/vertical YUV calculation block calculating horizontal YUV components and vertical YUV components of the current pixel from the composite video signals, and a YUV/RGB conversion circuit mixing the horizontal YUV components and the vertical YUV components based on the gradient grade and converting mixed YUV components generated as a result of the mixing to RGB components.

14 Claims, 8 Drawing Sheets

Current pixel is R2

First Order Derivative(D1):
D1_Horz = | G3−G4 |
D1_Vert = | G1−G2 |

First Order Derivative for neighbor(DN1):
DN1_Horz = | B1−B2 | + | B3−B4 |
DN1_Vert = | B1−B3 | + | B2−B4 |

Second Order Derivative(D2):
D2_Horz = | R2−(G3+G4) |
D2_Vert = | R2−(G1+G2) |

Second Order Derivative for neighbor(DN2):
DN2_Horz = | G1−(B1+B2) | + | G2−(B3+B4) |
DN2_Vert = | G3−(B1+B3) | + | G4−(B2+B4) |

Current pixel is G3

First Order Derivative(D1):
D1_Horz = | B1−B2 |
D1_Vert = | R1−R2 |

First Order Derivative for neighbor(DN1):
DN1_Horz = | G1−G2 | + | G3−G4 |
DN1_Vert = | G1−G3 | + | G2−G4 |

Second Order Derivative(D2):
D2_Horz = | G3−(B1+B2) |
D2_Vert = | G3−(R1+R2) |

Second Order Derivative for neighbor(DN2):
DN2_Horz = | R1−(G1+G2) | + | R2−(G3+G4) |
DN2_Vert = | B1−(G1+G3) | + | B2−(G2+G4) |

FIG. 4

| UL | U | UR |
|---|---|---|
| L | C | R |
| DR | D | DL |

Bayer data

HorSum2 = (L+R)/2; VerSum2 = (U+D)/2
DiagSum4 = (UL+UR+DL+DR)/4;
CMinusVerSum2 = C − VerSum2;
CMinusHorSum2 = C − HorSum2;
DiagSum4MinusHorSum2 = DiagSum4 − HorSum2;
DiagSum4MinusVerSum2 = DiagSum4 − VerSum2;

For Green pixel:
horz_U = CMinusHorSum2;
horz_V = DiagSum4MinusVerSum2;
vert_U = DiagSum4MinusHorSum2;
vert_V = CMinusVerSum2;

horz_Y4 = 3*C +HorSum2+ VerSum2 − DiagSum4 ;
vert_Y4 = 3*C +HorSum2+ VerSum2 − DiagSum4;

For Red/Blue pixel:
horz_U = −DiagSum4MinusVerSum2;
horz_V = −CMinusHorSum2;
vert_U = −DiagSum4MinusHorSum2;
vert_V = −CMinusVerSum2;

horz_Y4 =3*HorSum2 − VerSum2 + DiagSum4 + C ;
vert_Y4 =3*VerSum2 − HorSum2 + DiagSum4 + C ;

COLOR INTERPOLATION DEVICE AND COLOR INTERPOLATION METHOD

PRIORITY STATEMENT

This application claims priority under U.S.C. §119 to Korean Patent Application No. 10-2008-0088039, filed on Sep. 8, 2008, in the Korean Intellectual Property Office (KIPO), the entire contents of which are incorporated herein by reference.

BACKGROUND

1. Field

Example embodiments are directed to color interpolation technology, for example, to a color interpolation device having a small hardware size and a color interpolation method thereof.

2. Description of the Related Art

A demosaicing algorithm, which is one of a plurality of digital image processing methods, may be used to interpolate a complete image from partial raw data received from an image sensor based on a color filter array (CFA). The demosaicing algorithm may also be known as CFA interpolation, color interpolation, or color reconstruction.

SUMMARY

Example embodiments are directed to a color interpolation device and a method thereof which may optimize the size of hardware and may provide superior interpolation performance.

According to an example embodiment, a color interpolation device may comprise a gradient grade calculation block calculating horizontal derivatives and vertical derivatives using composite video signals output from a current pixel and adjacent pixels and calculating a gradient grade using a linear composition of the horizontal derivatives and the vertical derivatives, a horizontal/vertical YUV calculation block calculating horizontal YUV components and vertical YUV components of the current pixel from the composite video signals, and a YUV/RGB conversion circuit mixing the horizontal YUV components and the vertical YUV components based on the gradient grade and converting mixed YUV components to RGB components.

The YUV/RGB conversion circuit may comprise a mixed YUV calculation block calculating the mixed YUV components by mixing the horizontal YUV components and the vertical YUV components according to the gradient grade; a fully de-saturated UV calculation block comparing a value of each of the horizontal UV components of the horizontal YUV components and a value of each of the vertical UV components of the vertical YUV components and calculating fully de-saturated UV components according to a result of the comparison; a controlled de-saturated UV calculation block mixing each of the mixed UV components and each of the fully de-saturated UV components and calculating controlled de-saturated UV components; and a YUV/RGB conversion block converting a mixed Y component and the controlled de-saturated UV components to RGB components.

The mixed YUV calculation block may output at least one of the horizontal YUV components, the vertical YUV components and the horizontal YUV components and vertical YUV components mixed according to the gradient grade as the mixed YUV components.

According to example embodiments, the mixed YUV calculation block may output the mixed YUV components calculated by mixing the horizontal YUV components and the vertical YUV components when the gradient grade may be greater than a first threshold value and less than a second threshold value.

The mixed YUV calculation block may output the horizontal YUV components as the mixed YUV components when the gradient grade is not less than a first threshold value, and the vertical YUV components as the mixed YUV components when the gradient grade is not greater than a second threshold value.

According to example embodiments, the fully de-saturated UV calculation block may output a minimum of a horizontal U component and a vertical U component as a fully de-saturated U component when at least one of the horizontal U component and the vertical U component is greater than 0.

The fully de-saturated UV calculation block may output a maximum of a horizontal U component and a vertical U component as the fully de-saturated U component when at least one of the horizontal U component and the vertical U component is less than 0.

The fully de-saturated UV calculation block may output a "0" when at least one of a condition, a horizontal U component >0 and a vertical component <0, and the horizontal components <0 and the vertical component >0, is satisfied.

According to example embodiments, the fully de-saturated UV calculation block may output a minimum of a horizontal V component and a vertical V component as a fully de-saturated V component when at least one of the horizontal V component and the vertical V component is greater than 0.

The fully de-saturated UV calculation block may output a maximum of a horizontal V component and a vertical V component as the fully de-saturated V component when at least one of the horizontal V component and the vertical V component is less than 0.

The fully de-saturated UV calculation block may output a 0 when at least one of a condition, a horizontal V component >0 and a vertical V component <0, and the horizontal V component <0 and the vertical V component >0, is satisfied.

According to example embodiments, the controlled de-saturated UV calculation block may calculate the controlled de-saturated UV components by mixing each of the mixed UV components and each of the fully de-saturated UV component in response to a control signal having a first state, and outputs the mixed UV components as the controlled de-saturated UV components in response to a control signal having a second state.

The controlled de-saturated UV components also may include mixing a value representing a strength of de-saturation when the control signal is in the first state.

According to example embodiments, a color interpolation method may comprise calculating horizontal derivatives and vertical derivatives using composite video signals output from a current pixel and adjacent pixels and calculating a gradient grade using a linear composition of the horizontal derivatives and vertical derivatives; calculating horizontal YUV components and vertical YUV components of the current pixel from the composite video signals; and mixing the horizontal YUV components and the vertical YUV components based on the gradient grade and converting mixed YUV components to RGB components.

According to example embodiments, converting mixed YUV components to RGB components may comprise calculating the mixed YUV components by mixing the horizontal YUV components and the vertical YUV components according to the gradient grade, comparing a value of each of the horizontal UV components of the horizontal YUV components and a value of each of the vertical UV components of the vertical YUV components and calculating fully de-saturated UV components according to a result of the comparison, mixing each of the mixed UV components and each of the fully de-saturated UV components and calculating controlled de-saturated UV components and converting a mixed Y component and the controlled de-saturated UV components to RGB components.

According to example embodiments, calculating the mixed YUV components may include outputting at least one of the horizontal YUV components, the vertical YUV components and the horizontal YUV components and vertical YUV components mixed according to the gradient grade as the mixed YUV components.

According to example embodiments, calculating the mixed YUV components may further include outputting mixed the horizontal YUV components and the vertical YUV components when the gradient grade is greater than a first threshold value and less than a second threshold value.

The calculation of the mixed YUV components may further include outputting the horizontal YUV components as the mixed YUV components when the gradient grade is not less than a first threshold value and outputting the vertical YUV as the mixed YUV components when the gradient grade is not greater than a second threshold value.

According to example embodiments, calculating the fully de-saturated UV components may include outputting a minimum of a horizontal U component and a vertical U component as a fully de-saturated U component when at least one of the horizontal U component and the vertical U component is greater than 0.

The calculation of the fully de-saturated UV components may further include outputting a maximum of a horizontal U component and a vertical U component as the fully de-saturated U component when at least one of the horizontal U component and the vertical U component is less than 0

The calculation of the fully de-saturated UV components may still further include outputting a 0 when at least one of a condition, a horizontal U component >0 and a vertical component <0, and the horizontal component <0 and the vertical component >0, is satisfied.

According to example embodiments, a minimum of a horizontal V component and a vertical V component may be output as a fully de-saturated V component when at least one of the horizontal V component and the vertical V component is greater than 0.

According to example embodiments, a maximum of a horizontal V component and a vertical V component may be output as the fully de-saturated V component when at least one of the horizontal V component and the vertical V component is less than 0.

According to example embodiments, a 0 may be output when at least one of a condition, a horizontal V component >0 and a vertical V component <0, and the horizontal V component <0 and the vertical V component >0, is satisfied.

The method of calculating the controlled de-saturated UV components may include mixing each of the mixed UV components and each of the fully de-saturated UV component in response to a control signal having a first state, and outputting the mixed UV components as the controlled de-saturated UV components in response to a control signal having a second state.

The method of calculating the controlled de-saturated UV components may further include mixing a value representing a strength of de-saturation when the control signal is in the first state.

Example embodiments may also include a computer readable storage medium for storing a program for executing the color interpolation method.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 4 illustrates an example operation of a horizontal/vertical YUV calculation block of FIG. 1;

DETAILED DESCRIPTION OF EXAMPLE EMBODIMENTS

Figure 1:
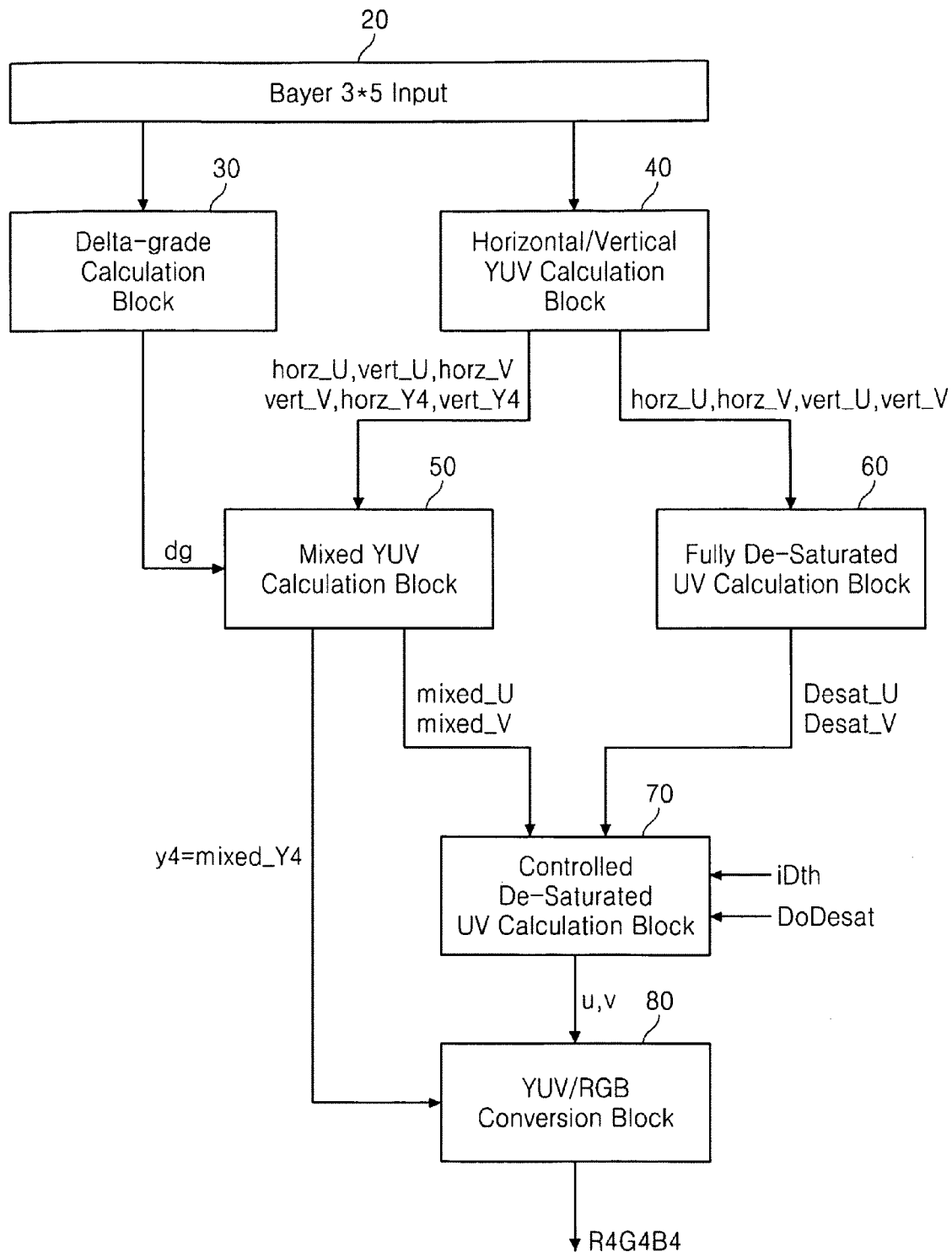
FIG. 1 is a block diagram of a color interpolation device according to an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of a color interpolation device 10 according to an example embodiment. Referring to FIG. 1, the color interpolation device 10 may be embodied in a solid state image pickup apparatus or an image processing apparatus, for example, and may include a pixel array (or a line memory) 20, a delta (or gradient) grade calculation block 30, a horizontal/vertical YUV calculation block 40, a mixed YUV calculation block 50, a fully de-saturated UV calculation block 60, a controlled de-saturated UV calculation block 70, and a YUV/RGB conversion block 80. One having ordinary skill in the art would appreciate that the term YUV refers to a standard for encoding color image or video data. Y represents the luminance component. The U and V components provide color information.

The mixed YUV calculation block 50, the fully de-saturated UV calculation block 60, the controlled de-saturated UV calculation block 70, and the YUV/RGB conversion block 80 may comprise a YUV/RGB conversion circuit. The YUV/RGB conversion circuit may mix horizontal YUV components and vertical YUV components according to a delta (or gradient) grade "dg" and may convert mixed YUV components to RGB components.

The pixel array 20 may include an array of a plurality of light-sensitive elements or pixels. Among the pixels, a first-type pixel may convert light corresponding to a red spectrum region to an electrical signal, a second-type pixel may convert light corresponding to a green spectrum region to an electrical signal, and a third-type pixel may convert light corresponding to a blue spectrum region to an electrical signal.

A first-type filter for transmitting light in the red spectrum region may be embodied in the first-type pixel. A second-type filter for transmitting light in the green spectrum region may be embodied in the second-type pixel. A third-type filter for transmitting light in the blue spectrum region may be embodied in the third-type pixel. For example, the pixel array 20 may include repetitive patterns and each of the patterns may include the first to third type pixels and/or the first to third type filters.

Each of the repetitive patterns may be an m×n Bayer pattern, as is assumed herein. "m" and "n" may be natural numbers, for example, m=3 and n=5. Thus, the pixel array 20 including a 3×5 Bayer pattern may output Bayer signals.

Figure 2:
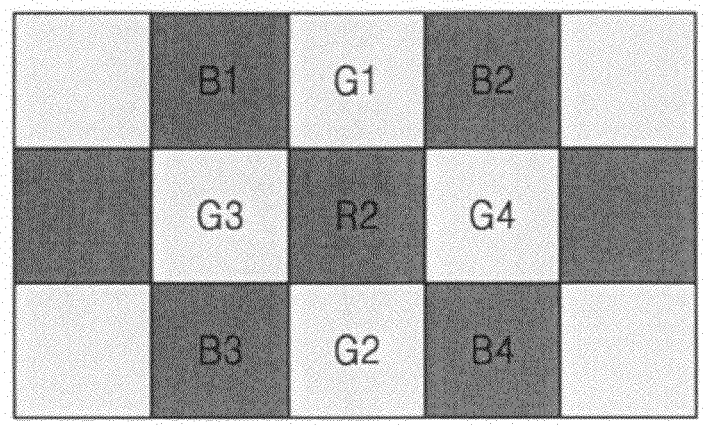
FIG. 2 illustrates an example calculation operation of a delta grade calculation block of FIG. 1.
Figure 3:
FIG. 3 illustrates another example calculation operation of the delta grade calculation block of FIG. 1.

When the pixel array 20 is embodied as a line memory, the line memory may store Ri, Gi, and Bi as illustrated in the examples of FIG. 2, 3, or 4. "i" is a natural number and "Ri" indicates a red intensity value, "Gi" indicates a green intensity value, and "Bi" indicates a blue intensity value.

FIG. 2 illustrates an example calculation operation of the delta grade calculation block 30 of FIG. 1. Referring to FIG. 2, R2 may denote a red pixel converting light corresponding to a red spectrum region to an electrical signal or an electrical signal (or a red intensity value) output from the red pixel. Each of G1 to G4 may denote a green pixel converting light corresponding to a green spectrum region to an electrical signal or an electrical signal (or a green intensity value) output from the green pixel. Also, each of B1 to B4 may denote a blue pixel converting light corresponding to a blue spectrum region to an electrical signal or an electrical signal (or a blue intensity value) output from the blue pixel.

The Bayer signals may include electrical signals output from the red pixel, the green pixel, and the blue pixel. The delta grade calculation block 30 may calculate horizontal derivatives and vertical derivatives using composite video signals (or Bayer signals) output from a current pixel and adjacent pixels and may calculate a gradient grade using a linear composition of the horizontal derivatives and vertical derivatives. The delta (or gradient) grade "dg" may be used as an indicator of a difference between the horizontal and vertical derivatives. The calculation process of the delta grade "dg" by the delta grade calculation block 30 is described below in detail.

Referring to FIGS. 1 and 2, first order derivatives of a signal R2 output from a red pixel may be calculated from information output from a color channel. A color channel, for example, may be a channel that may transmit a signal output from each of the colored pixels. For example, the delta grade calculation block 30 may receive information from a single color channel and may calculate a first order horizontal derivative $D1\_Horz$ and a first order vertical derivative $D1\_Vert$ of the signal R2 output from the red pixel using Equation 1. According to example embodiments, the derivatives may be interpolation values.

$$D1\_Horz = |G3 - G4|$$

$$D1\_Vert = |G1 - G2| \hspace{3cm} \text{(Equation 1)}$$

The delta grade calculation block 30 may calculate a first order horizontal derivative DN1_Horz and a first order vertical derivative DN1_Vert of the electrical signals output from the pixels neighboring the current red pixel by applying Equation 2 to the received information.

$$DN1\_Horz=|B1-B2|+|B3-B4|$$

$$DN1\_Vert=|B1-B3|+|B2-B4| \quad \text{(Equation 2)}$$

Second order derivatives of the signal R2 output from the red pixel may be calculated from information output from two color channels, for example, from a channel transmitting an electrical signal output from each of the red pixel and from a channel transmitting an electrical signal output from each of the green pixel. For example, the delta grade calculation block 30 may calculate a second order horizontal derivative D2_Horz and a second order vertical derivative D2_Vert of the signal R2 output from the red pixel by applying Equation 3 to the information received through the two channels.

$$D2\_Horz=|R2-(G3+G4)|$$

$$D2\_Vert=|R2-(G1+G2)| \quad \text{(Equation 3)}$$

The delta grade calculation block 30 may calculate a second order horizontal derivative DN2_Horz and a second order vertical derivative DN2_Vert of the electrical signals output from the pixels neighboring the current red pixel by applying Equation 4 to the information received through the two channels.

$$DN2\_Horz=|G1-(B1+B2)|+|G2-(B3+B4)|$$

$$DN2\_Vert=|G3-(B1+B3)|+|G4-(B2+B4)| \quad \text{(Equation 4)}$$

A horizontal grade (or a horizontal gradient grade) Horz_Grade and a vertical grade (or a vertical gradient grade) Vert_Grade may be calculated using Equation 5. Each of the values calculated from Equations 1 to 4 may be an absolute value.

$$Horz\_Grade = W1 \times D1\_Horz + WN1 \times DN1\_Horz + W2 \times D2\_Horz + WN2 \times DN2\_Horz$$

$$Vert\_Grade = W1 \times D1\_Vert + WN1 \times DN1\_Vert + W2 \times D2\_Vert + WN2 \times DN2\_Vert \quad \text{(Equation 5)}$$

In Equation 5, "W1" and "WN1" may be a weight for each of the first order derivatives and "W2" and "WN2" may be a weight for each of the second order derivatives. "W1", "WN1", "W2", and "WN2" may each be stored in an externally controlled register (not shown) embodied in the delta grade calculation block 30.

The horizontal grade Horz_Grade may be weighted sums of the first order derivatives and the second order derivatives with respect to the horizontal direction. The vertical grade Vert_Grade may be weighted sums of the first order derivatives and the second order derivatives with respect to the vertical direction. A larger weight for the first order derivatives may result in a superior performance at all edges.

A delta grade (or a difference between vertical gradient and horizontal gradient) "dg" may be calculated using Equation 6.

$$dg = Vert\_Grade - Horz\_Grade \quad \text{(Equation 6)}$$

In the above equations, G1~G4 and B1~B2 are neighboring pixels or composite video signals output from the neighboring pixels.

FIG. 3 illustrates another example calculation operation of the delta grade calculation block 30 of FIG. 1. Referring to FIG. 3, the first order derivatives of the signal G3 output from a current pixel, for example a green pixel, may be calculated from information output from a single color channel. For example, the delta grade calculation block 30 may receive information including Bayer signals from a single color channel transmitting an electrical signal output from each of the blue pixels or red pixels, and may calculate a first order horizontal derivative D1_Horz and a first order vertical derivative D1_Vert of the signal G3 output from the green pixel by applying Equation 7 to the received information.

$$D1\_Horz=|B1-B2|$$

$$D1\_Vert=|R1-R2| \quad \text{(Equation 7)}$$

The delta grade calculation block 30 may calculate a first order horizontal derivative DN1_Horz and a first order vertical derivative DN1_Vert of the electrical signals output from the pixels neighboring the current green pixel by applying Equation 8 to the received information.

$$DN1\_Horz=|G1-G2|+|G3-G4|$$

$$DN1\_Vert=|G1-G3|+|G2-G4| \quad \text{(Equation 8)}$$

Second order derivatives of the signal G3 output from the green pixel may be calculated from information output from two color channels, for example, a channel transmitting an electrical signal output from each of the red pixels and a channel transmitting an electrical signal output from each of the green pixels. For example, the delta grade calculation block 30 may calculate a second order horizontal derivative D2_Horz and a second order vertical derivative D2_Vert of the signal G3 output from the green pixel by applying Equation 9 to the information received through the two channels.

$$D2\_Horz=|G3-(B1+B2)|$$

$$D2\_Vert=|G3-(R1+R2)| \quad \text{(Equation 9)}$$

The delta grade calculation block 30 may calculate a second order horizontal derivative DN2_Horz and a second order vertical derivative DN2_Vert of electrical signals received from the pixels neighboring the current green pixel by applying Equation 10 to the information received through the two channels.

$$DN2\_Horz=|R1-(G1+G2)|+|R2-(G3+G4)|$$

$$DN2\_Vert=|B1-(G1+G3)|+|B2-(G2+G4)| \quad \text{(Equation 10)}$$

In case illustrated in FIG. 3, a horizontal grade Horz_Grade and a vertical grade Vert_Grade may be calculated using Equation 5. Also, the delta grade may be calculated using Equation 6. Furthermore, a person of ordinary skill in the art can easily understand the calculation process of the delta grade "dg" of the signal output from the blue pixel using Equations 1 to 6.

FIG. 4 illustrates an example operation of a horizontal/vertical YUV calculation block 40 of FIG. 1. Referring to FIG. 4, the horizontal/vertical YUV calculation block 40 may calculate luma (Y) components and chroma (UV) components from the received Bayer signals (or composite video signals).

Each of the Y components may include a horizontal Y value horz_Y4 and a vertical Y value vert_Y4. Each of the UV components may include horizontal UV values horz_U and horz_V and vertical UV values vert_U and vert_V.

In FIG. 4, "C", "U", "D", "UL", "UR", "L", "R", "DR", and "DL" may represent Bayer signals (or Bayer data) output from each pixel. Thus, the horizontal/vertical YUV calculation block 40 may perform interpolation regardless of the type of pixel (or a signal output from a pixel of a different kind).

For example, "C" of FIG. 4 may represent R2 of FIG. 2 or G3 of FIG. 3, "U" of FIG. 4 may represent G1 of FIG. 2 or R1 of FIG. 3 and "L" of FIG. 4 may represent G3 of FIG. 2 or B1 of FIG. 3. Accordingly, one of ordinary skill in the art can easily understand the relationship between FIGS. 2 and 4 or between FIGS. 3 and 4.

Referring to FIG. 4, each value may be defined as follows.

$$HorSum2=(L+R)/2;$$

$$VerSum2=(U+D)/2;$$

$$DiagSum4=(UL+UR+DL+DR)/4;$$

$$CMinusVerSum2=C-VerSum2;$$

$$CMinusHorSum2=C-HorSum2;$$

$$DiagSum4MinusHorSum2=DiagSum4-HorSum2;$$
and $$DiagSum4MinusVerSum2=DiagSum4-VerSum2.$$

When a current pixel, for example a green pixel, outputs the signal C, the horizontal/vertical YUV calculation block 40 may calculate each of the horizontal UV values horz_U and horz_V, each of the vertical UV values vert_U and vert_V, the horizontal Y value horz_Y4, and the vertical Y value vert_Y4 of the green pixel, using Equation 11.

$$horz\_U=CMinusHorSum2;$$

$$horz\_V=DiagSum4MinusVerSum2;$$

$$vert\_U=DiagSum4MinusHorSum2;$$

$$vert\_V=CMinusVerSum2;$$

$$horz\_Y4=3\times C+HorSum2+VerSum2-DiagSum4;\text{ and}$$

$$vert\_Y4=3\times C+HorSum2+VerSum2-DiagSum4. \quad \text{(Equation 11)}$$

When a current pixel, for example a red or a blue pixel, outputs signal C, the horizontal/vertical YUV calculation block 40 may calculate each of the horizontal UV values horz_U and horz_V, each of the vertical UV values vert_U and vert_V, the horizontal Y value horz_Y4, and the vertical Y value vert_Y4 of the red pixel or the blue pixel, using Equation 12.

$$horz\_U=-DiagSum4MinusVerSum2;$$

$$horz\_V=-CMinusHorSum2;$$

$$vert\_U=-DiagSum4MinusHorSum2;$$

$$vert\_V=-CMinusVerSum2;$$

$$horz\_Y4=3\times HorSum2-VerSum2+DiagSum4+C;\text{ and}$$

$$vert\_Y4=3\times VerSum2-HorSum2+DiagSum4+C. \quad \text{(Equation 12)}$$

Figure 5:
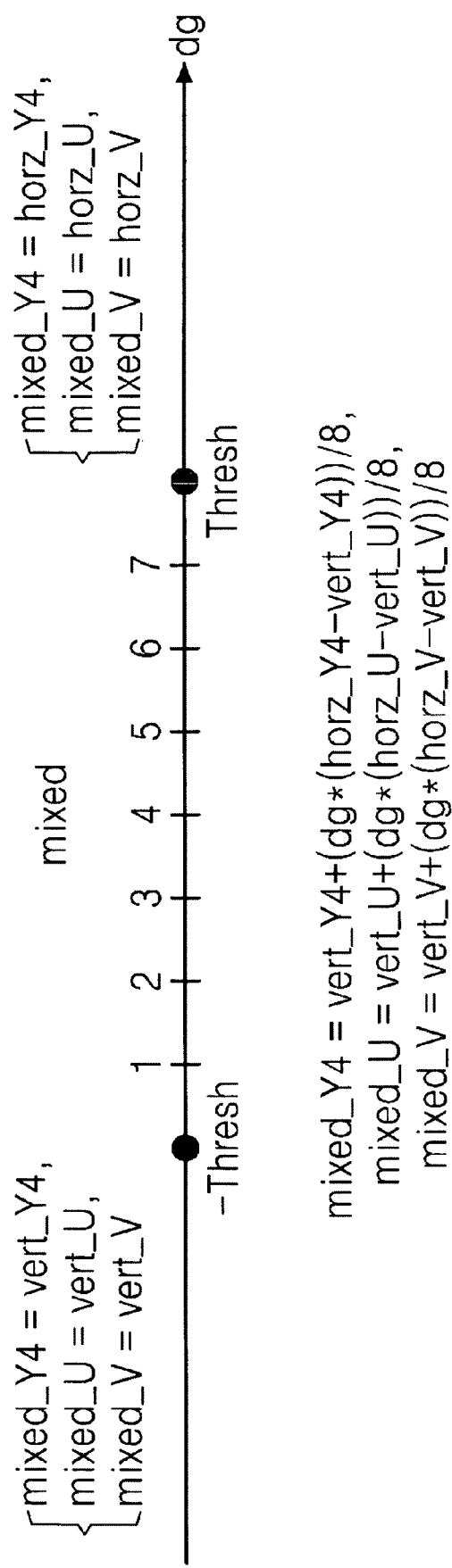
FIG. 5 illustrates an example operation of a mixed YUV calculation block of FIG. 1.

FIG. 5 illustrates an example operation of a mixed YUV calculation block 50 of FIG. 1. The mixed YUV calculation block 50 may mix each of the horizontal YUV components horz_Y4, horz_U, and horz_V and each of the vertical YUV components vert_Y4, vert_U, and vert_V according to the delta grade "dg". For example, when the delta grade "dg" is between a first threshold Thresh and a second threshold -Thresh, the mixed YUV calculation block 50 may calculate and output a mixed Y value (or component) mixed_Y4 and each of the mixed UV values (or components) mixed_U and mixed_V, using Equation 13.

$$y4=mixed\_Y4=vert\_Y4+[dg\times(horz\_Y4-vert\_Y4)]/8;$$

$$mixed\_U=vert\_U+[dg\times(horz\_U-vert\_U)]/8;\text{ and}$$

$$mixed\_V=vert\_V+[dg\times(horz\_V-vert\_V)]/8. \quad \text{(Equation 13)}$$

However, for example, when the delta grade "dg" is not less than the first threshold value Thresh, the mixed YUV calculation block 50 may calculate and output the mixed Y value mixed_Y4 and each of the mixed UV values mixed_U and mixed_V, using Equation 14.

$$mixed\_Y4=horz\_Y4;$$

$$mixed\_U=horz\_U;\text{ and}$$

$$mixed\_V=horz\_V. \quad \text{(Equation 14)}$$

Also, for example, when the delta grade "dg" is not greater than the second threshold value -Thresh, the mixed YUV calculation block 50 may calculate and output the mixed Y value mixed_Y4 and each of the mixed UV values mixed_U and mixed_V, using Equation 15.

$$mixed\_Y4=vert\_Y4;$$

$$mixed\_U=vert\_U;\text{ and}$$

$$mixed\_V=vert\_V. \quad \text{(Equation 15)}$$

The mixed YUV calculation block 50 may receive the horizontal UV values horz_U and horz_V, the vertical UV values vert_U and vert_V, the horizontal Y value horz_Y4, the vertical Y value vert_Y4, and the delta grade value "dg" and may output the mixed Y value mixed_Y4 and the mixed_UV values mixed_U and mixed_V based on the delta grade "dg" using Equation 13, 14, or 15, for example.

Figure 6:
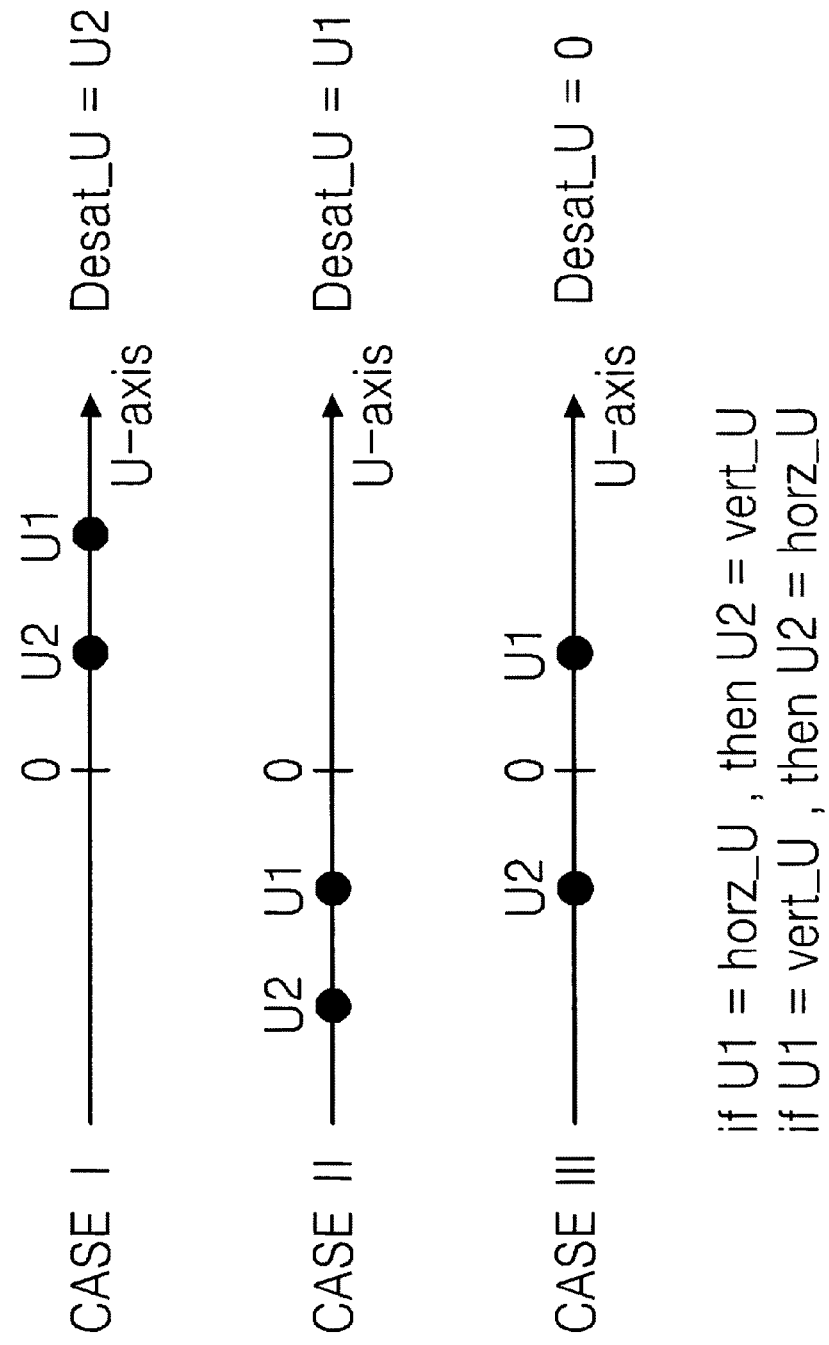
FIG. 6 illustrates an example operation of a fully de-saturated UV calculation block of FIG. 1.

FIG. 6 illustrates an example operation of a fully de-saturated UV calculation block 60 of FIG. 1. Referring to FIG. 6, the fully de-saturated UV calculation block 60 may calculate a fully de-saturated U value Desat_U based on the horizontal U value horz_U and the vertical U value vert_U.

In a first case, Case 0, wherein U1 and U2 may be greater than 0, the fully de-saturated UV calculation block 60 may output the minimum of U1 and U2. In a second case, Case II, wherein U1 and U2 may be smaller than 0, the fully de-saturated UV calculation block 60 may output the maximum of U1 and U2. In a third case, Case III, wherein U1 may be greater than 0 and U2 may be smaller than 0 or wherein U2 may be greater than 0 and U1 may be smaller than 0, the fully de-saturated UV calculation block 60 may output "0". In the instant example, when U1 may be vert_U, U2 may be horz_U. Conversely, when U1 may be horz_U, U2 may be vert_U.

Figure 7:
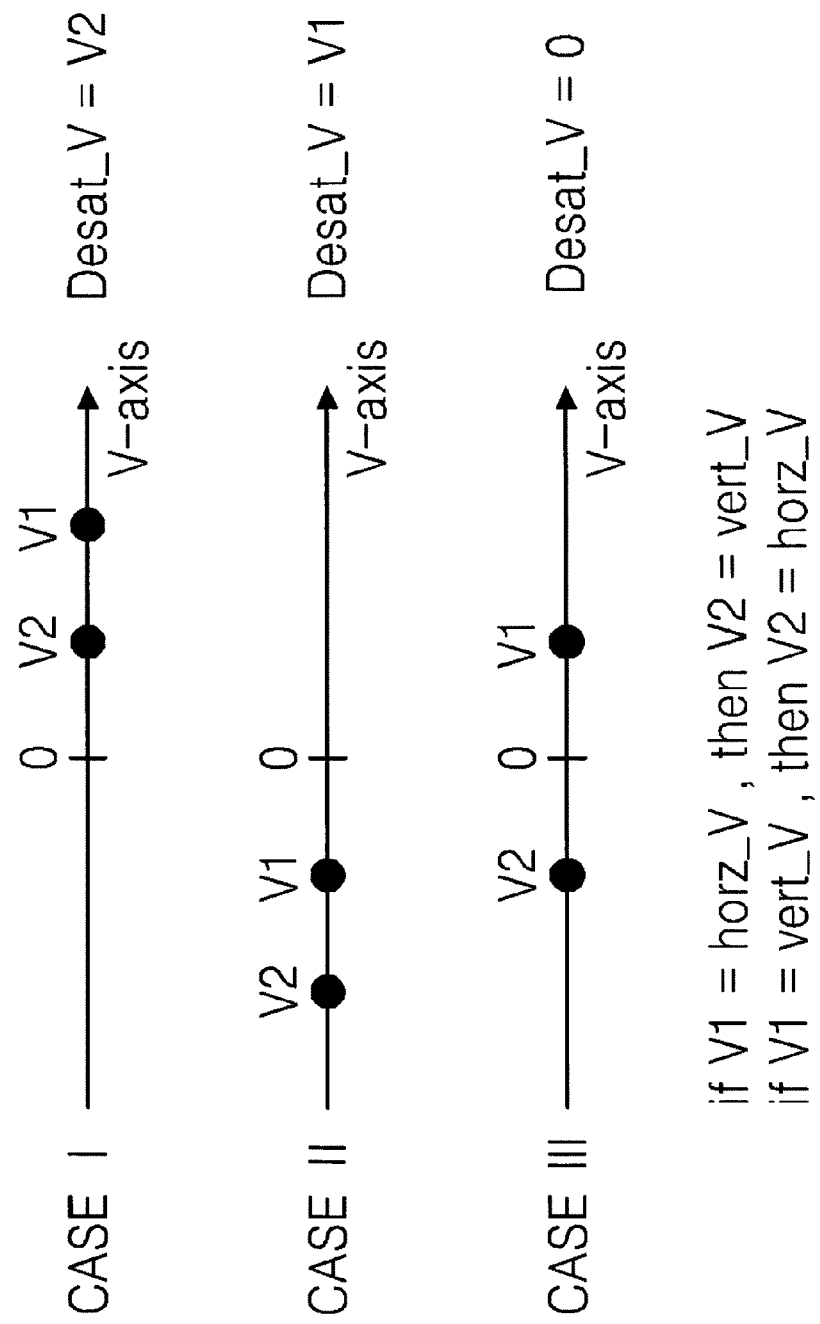
FIG. 7 illustrates another example operation of a fully de-saturated UV calculation block of FIG. 1.

FIG. 7 illustrates another example operation of a fully de-saturated UV calculation block 60 of FIG. 1. Referring to FIG. 7, the fully de-saturated UV calculation block 60 may calculate a fully de-saturated V value Desat_V based on the horizontal V value horz_V and the vertical V value vert_V.

In a first case, Case I, wherein V1 and V2 are greater than 0, the fully de-saturated UV calculation block 60 may output the minimum of V1 and V2. In a second case, Case II, wherein V1 and V2 are less than 0, the fully de-saturated UV calculation block 60 may output the maximum of V1 and V2. In a third case, Case III, wherein V1 is greater than 0 and V2 is smaller than 0 or wherein V2 is greater than 0 and V1 is smaller than 0, the fully de-saturated UV calculation block 60 may output "0". In the instant example, when V1 is horz_V, V2 is vert_V. Conversely, when V1 is vert_V, V2 is horz_V.

Figure 8:
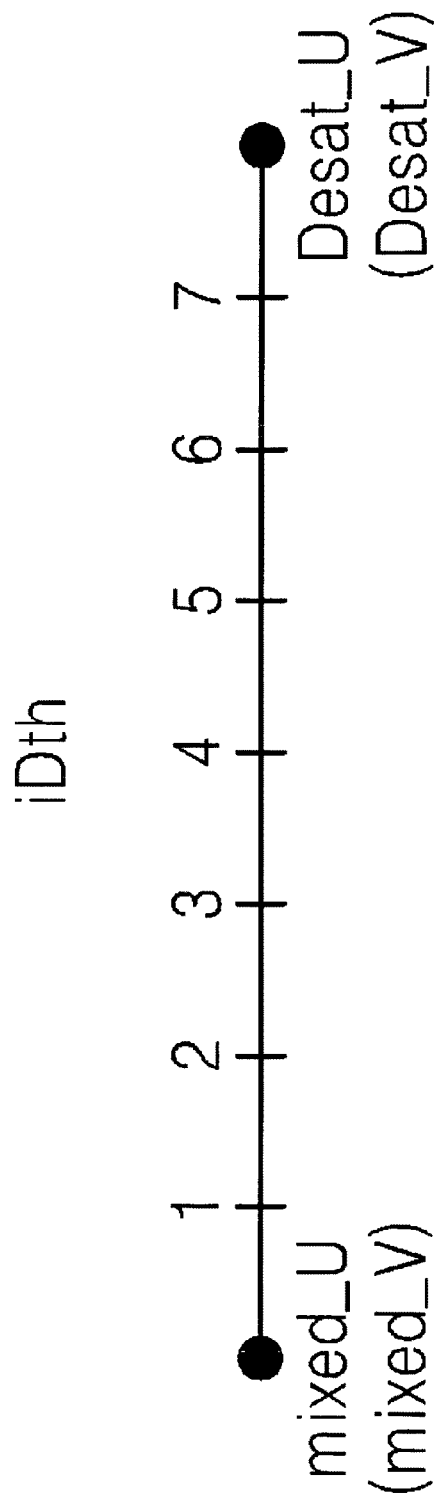
FIG. 8 illustrates an example operation of a controlled de-saturated UV calculation block of FIG. 1.

FIG. 8 illustrates an example operation of a controlled de-saturated UV calculation block 70 of FIG. 1. Referring to FIG. 8, the controlled de-saturated UV calculation block 70 may calculate and output controlled de-saturated UV values u and v in response to the mixed UV values mixed_U and mixed_V calculated by the mixed YUV calculation block 50, the fully de-saturated UV values Desat_U and Desat_V calculated by the fully de-saturated UV calculation block 60, and a control signal DoDesat.

When the control signal DoDesat has a first value, for example, a high level or data "1", the controlled de-saturated UV calculation block 70 may calculate the de-saturated UV values u and v using Equation 16. iDth may represent the strength of de-saturation and may have any value between 0 to 8.

$$u = Desat\_U + [iDth \times (mixed\_U - Desat\_U)]/8; \text{ and}$$

$$v = Desat\_V + [iDth \times (mixed\_V - Desat\_V)]/8. \quad \text{(Equation 16)}$$

When the control signal DoDesat has a second value, for example, a low level or data "0", the controlled de-saturated UV calculation block 70 may output the mixed UV values mixed_U and mixed_V as the controlled de-saturated UV values u and v by bypassing the de-saturation operation as shown in Equation 17.

$$u = mixed\_U; \text{ and}$$

$$v = mixed\_V. \quad \text{(Equation 17)}$$

The YUV/RGB conversion block 80 may convert the mixed Y value output from the mixed YUV calculation block 50 (y4=mixed_Y4) and the controlled de-saturated UV values u and v output from the controlled de-saturated UV calculation block 70 to RGB signals R4G4B4 using Equation 18.

$$G4 = y4 + u + v;$$

$$R4 = G4 - 4 \times u; \text{ and}$$

$$B4 = G4 - 4 \times v. \quad \text{(Equation 18)}$$

As described above, the YUV/RGB conversion block 80 may split the signal R2 output from the red pixel of FIG. 3 into the green signal G4, the red signal R4, and the blue signal B4, using Equation 18. Also, the YUV/RGB conversion block 80 may split the signal G3 output from the green pixel of FIG. 4 into the green signal G4, the red signal R4, and the blue signal B4, using Equation 18.

The conversion relationship between the YUV components YUV and the RGB components RGB according to an example embodiment is shown in Equation 19.

$$Y = R + 2 \times G + B;$$

$$U = G - R; \text{ and}$$

$$V = G - B. \quad \text{(Equation 19)}$$

As described above, the color interpolation device according to example embodiments may exhibit an optimal interpolation performance and may reduce the size of hardware.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A color interpolation device comprising:
   a gradient grade calculation block calculating horizontal derivatives and vertical derivatives using composite video signals output from a current pixel and adjacent pixels and calculating a gradient grade using a linear composition of the horizontal derivatives and vertical derivatives;
   a horizontal/vertical YUV calculation block calculating horizontal YUV components and vertical YUV components of the current pixel from the composite video signals;
   a YUV/RGB conversion circuit mixing the horizontal YUV components and the vertical YUV components based on the gradient grade and converting mixed YUV components to RGB components,
   wherein the YUV/RGB conversion circuit comprises,
      a mixed YUV calculation block calculating the mixed YUV components by mixing the horizontal YUV components and the vertical YUV components according to the gradient grade,
      a fully de-saturated UV calculation block comparing a value of each of the horizontal UV components of the horizontal YUV components and a value of each of the vertical UV components of the vertical YUV components and calculating fully de-saturated UV components according to a result of the comparison,
      a controlled de-saturated UV calculation block mixing each of the mixed UV components and each of the fully de-saturated UV components and calculating controlled de-saturated UV components, and
      a YUV/RGB conversion block converting a mixed Y component and the controlled de-saturated UV components to RGB components.

2. The color interpolation device of claim 1, wherein the mixed YUV calculation block outputs at least one of the horizontal YUV components, the vertical YUV components and the horizontal YUV components and vertical YUV components mixed according to the gradient grade as the mixed YUV components.

3. The color interpolation device of claim 2, wherein the mixed YUV calculation block outputs the mixed YUV components calculated by mixing the horizontal YUV components and the vertical YUV components when the gradient grade is greater than a first threshold value and less than a second threshold value.

4. The color interpolation device of claim 2, wherein the mixed YUV calculation block outputs the horizontal YUV components as the mixed YUV components when the gradient grade is not less than a first threshold value, and the vertical YUV components as the mixed YUV components when the gradient grade is not greater than a second threshold value.

5. The color interpolation device of claim 1, wherein the fully de-saturated UV calculation block outputs a minimum of a horizontal U component and a vertical U component as a fully de-saturated U component when at least one of the horizontal U component and the vertical U component is greater than 0.

6. The color interpolation device of claim 1, wherein the fully de-saturated UV calculation block outputs a maximum of a horizontal U component and a vertical U component as the fully de-saturated U component when at least one of the horizontal U component and the vertical U component is less than 0.

7. The color interpolation device of claim 1, wherein the fully de-saturated UV calculation block outputs a "0" when at least one a condition, horizontal U component >0, vertical component <0, and horizontal component <0 and the vertical component >0 is satisfied.

8. The color interpolation device of claim 1, wherein the fully de-saturated UV calculation block outputs a minimum of a horizontal V component and a vertical V component as a fully de-saturated V component when at least one of the horizontal V component and the vertical V component is greater than 0.

9. The color interpolation device of claim 1, wherein the fully de-saturated UV calculation block outputs a maximum of a horizontal V component and a vertical V component as the fully de-saturated V component when at least one of the horizontal V component and the vertical V component is less than 0.

10. The color interpolation device of claim 1, wherein the fully de-saturated UV calculation block outputs a 0 when at least one of a condition, horizontal V component >0 and vertical V component <0, and horizontal V component <0 and vertical V component >0 is satisfied.

11. The color interpolation device of claim 1, wherein the controlled de-saturated UV calculation block calculates the controlled de-saturated UV components by mixing each of the mixed UV components and each of the fully de-saturated UV components in response to a control signal having a first state, and outputs the mixed UV components as the controlled de-saturated UV components in response to a control signal having a second state.

12. The color interpolation device of claim 11, wherein calculating the controlled de-saturated UV components further includes mixing a value representing a strength of de-saturation when the control signal is in the first state.

13. The color interpolation device of claim 1, being an image pickup device.

14. A color interpolation device comprising:
a fully de-saturated UV calculation block comparing a value of each horizontal UV component of horizontal YUV components and a value of each vertical UV component of vertical YUV components and calculating fully de-saturated UV components;
a YUV/RGB conversion block converting a mixed Y component and controlled de-saturated UV components calculated by mixing UV components and fully de-saturated UV components to RGB components.

* * * * *